(No Model.)
C. D. POWERS, Jr.
ATTACHMENT FOR LAWN MOWERS.
No. 433,029. Patented July 29, 1890.
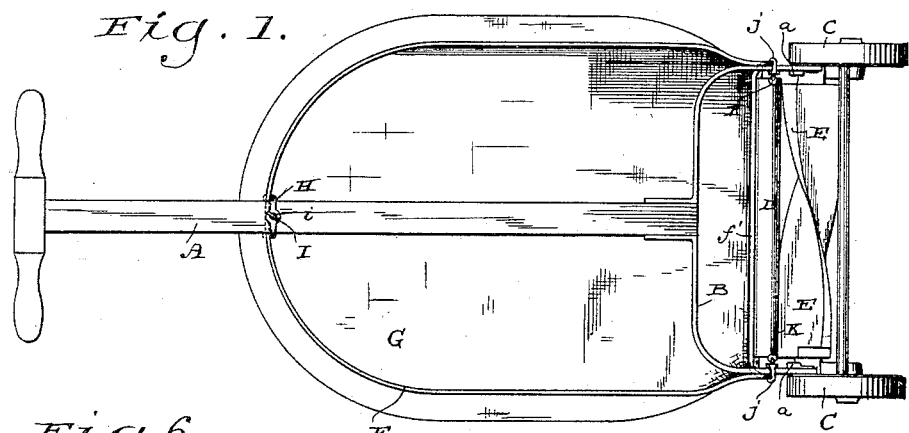
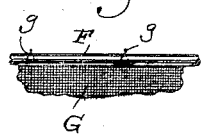
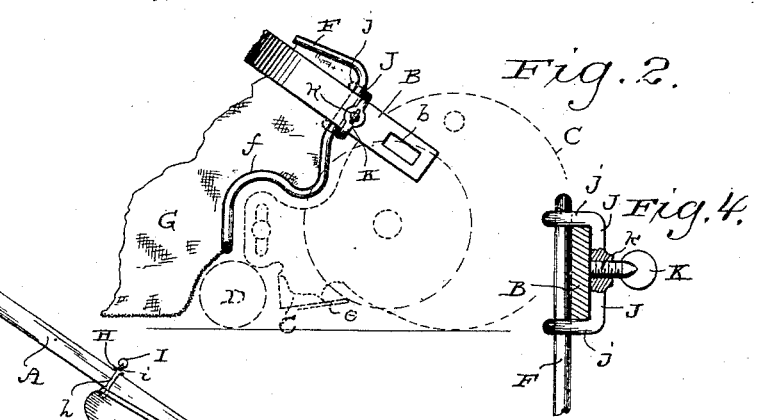
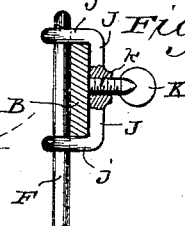
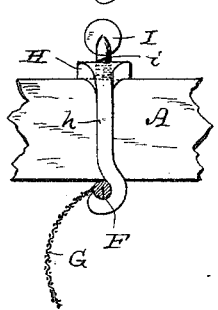
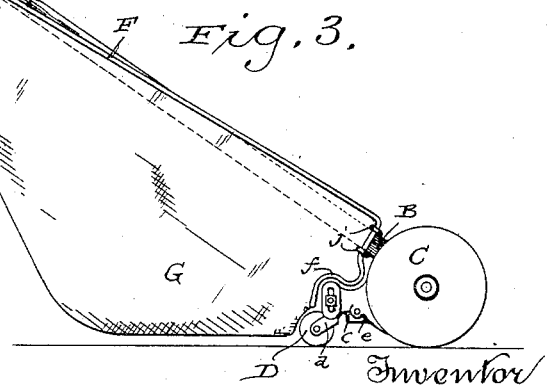
Witnesses
Geo. W. Young
Wm. Klug
Inventor
Charles D. Powers, Jr.
By Stout & Underwood
Attorneys

UNITED STATES PATENT OFFICE.

CHARLES D. POWERS, JR., OF MILWAUKEE, WISCONSIN.

ATTACHMENT FOR LAWN-MOWERS.

SPECIFICATION forming part of Letters Patent No. 433,029, dated July 29, 1890.

Application filed August 26, 1889. Serial No. 321,936. (No model.)

*To all whom it may concern:*

Be it known that I, CHARLES D. POWERS, Jr., of Milwaukee, in the county of Milwaukee, and in the State of Wisconsin, have invented certain new and useful Improvements in Attachments to Lawn-Mowers; and I do hereby declare that the following is a full, clear, and exact description thereof.

My invention relates to attachments to lawn-mowers; and it consists in certain peculiarities of construction, as will be fully set forth hereinafter, and subsequently claimed.

In the drawings, Figure 1 is a plan view of a lawn-mower with my attachment secured thereto in operative position. Fig. 2 is a detail inside view of the forward part of my attachment, showing the lawn-mower in dotted lines. Fig. 3 is a side elevation of my device attached to a lawn-mower. Figs. 4, 5, and 6 are details.

The object of my present invention is to provide a grass basket or receptacle to be directly attached to the handle and handle-yoke of a lawn-mower, but free from attachment to any operative part of the machine or its roller, whereby greater simplicity in construction is attained with increased facility for dumping the basket and in raising the basket over obstructions in the use of the lawn-mower.

A represents the handle of a lawn-mower, and B the handle-yoke, the latter being provided with the usual slots $b$ for attachment to the lugs $a$ on the wheels C of the machine, which may be of any ordinary kind—such, for example, as shown in the drawings—with the usual roller D suspended from rearward-projecting brackets $c$ and hangers $d$, knives E, and cutter-bar or shear-plate $e$, or of any other construction preferred.

F is a border-wire, preferably bent into a general U shape, but with its front portion $f$ bent downward into such shape as will conform to the general configuration of the adjacent rear portions of the lawn-mower at each side, and thence continued from side to side in a straight line, forming a bar $f'$, parallel with the roller D. This border-wire F is welded or otherwise united, so as to be practically continuous, and to it are secured the edges of a sheet of wire-gauze or other suitable material, forming the grass basket or receptacle G, best secured to the border-wire F by loops of wire $g$, as shown in Fig. 6.

H is a clamp consisting of a bar or plate with a pair of hook-arms $h$, which straddle the handle A and receive the rear part of the border-wire F, a set-screw I, passing through a screw-threaded bore $i$ in the bar or plate of the clamp H, and bearing against the upper surface of the handle A. J J are similar clamps, whose hook-arms $j\,j$ straddle the ends of the handle-yoke B and receive the forward portions of the border-wire F, and by means of the set-screws K K and screw-threaded bores $k\,k$ in the bars or plates of the clamps J draw said portions of the wire F (and the basket G secured thereto) against the outer side of the yoke ends, as shown.

The operation of my device will be apparent from the foregoing description of its construction. The grass, &c., as fast as it is cut falls into the basket G, and as the latter is everywhere free from any frame, except the border-wire, it always lies on the ground ready for service, no matter at what elevation or inclination the handle may be held. Again, as the basket is attached solely and directly to the handle and its yoke, by raising said handle the basket can be elevated so as to clear any obstruction, and yet be kept sufficiently low at the front to receive the grass, and as the basket G is not attached to the machine proper in any manner it can be more freely and readily dumped than is the case with baskets secured to the roller-axles or their brackets or other parts of the lawn-mower itself.

Having thus described my invention, what I claim as new, and desire to secure by Letters Patent, is—

1. In a lawn-mower, the combination, with the handle, of a border-wire formed of a single continuous piece of wire, adjustable clamps for securing the same to the handle, and a basket suspended from the wire, substantially as described.

2. The combination, with a lawn-mower handle and its yoke, of a horizontally-disposed border-wire, a basket or receptacle secured to and suspended from the border-wire, and a series of adjustable clamps and set-screws for holding said border-wire tightly against the said handle and yoke.

3. The combination, with a lawn-mower and its handle and handle-yoke, of a border-wire of general U shape bent at its forward portions to conform to the configuration of the adjacent rear portions of the mower and clamped directly to said handle and yoke, and a grass-basket secured directly to said border-wire and free from contact with any part of the mower proper.

In testimony that I claim the foregoing I have hereunto set my hand, at Milwaukee, in the county of Milwaukee and State of Wisconsin, in the presence of two witnesses.

CHARLES D. POWERS, JR.

Witnesses:
H. G. UNDERWOOD,
WILLIAM KLUG.